March 1, 1960  K. GEBELE  2,926,585

PHOTOGRAPHIC SHUTTER

Filed March 31, 1955

United States Patent Office 2,926,585
Patented Mar. 1, 1960

2,926,585

PHOTOGRAPHIC SHUTTER

Kurt Gebele, Munich, Germany, assignor, by mesne assignments, to Compur-Werk Friedrich Deckel OHG., Munich, Germany, a firm of Germany Application March 31, 1955, Serial No. 498,379

Claims priority, application Germany April 2, 1954

3 Claims. (Cl. 95—64)

The invention relates to an objective or between-the-lens photographic shutter having shutter speed, diaphragm, and photoflash adjusting rings disposed in coaxial relationship with respect to the camera optical axis, and with shutter cocking and release levers extending from the rear wall thereof. This arrangement permits the various shutter adjustments to be made while looking down on the camera as it is held in its normal operating position and provides a shutter structure which resembles, in appearance, an interchangeable lens construction.

An object of the invention is to provide a generally improved and more satisfactory photographic shutter.

Another object is to provide an objective or between-the-lens shutter of tubular construction wherein the shutter speed, diaphragm, and flashlight mechanisms are set by adjustable rings disposed on the shutter periphery in coaxial relation with respect to the optical axis of the camera, and with the shutter speed and diaphragm adjusting ring being adjustably coupled to each other.

Still another object is to provide an objective shutter of tubular construction having total exposure value, shutter speed, and diaphragm aperture scales which are positioned adjacent to each other and visible to the operator when the shutter is held in its normal operating position.

A further object is the provision of a shutter having shutter tensioning and release means and flashlight contact terminal means extending from the rear face thereof.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
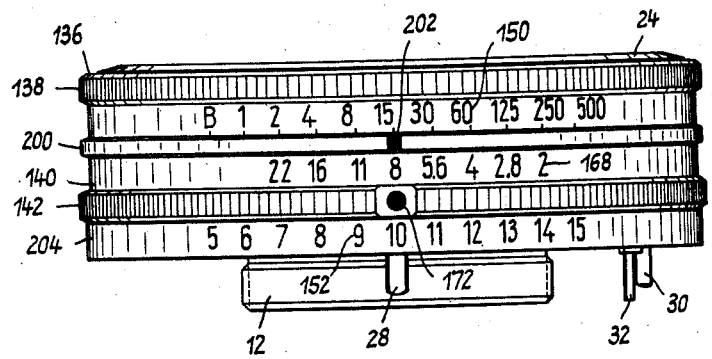
Fig. 1 is a top plan or edge view of one embodiment of the invention as it will appear when the camera to which it is attached is placed in its position for making an exposure.

In the conventional constructions of objective or between-the-lens shutter, the shutter speed and diaphragm settings are made by rotatably adjusting a pair of coaxial rings relative to scales located on the front face of the shutter. These rings are positioned adjacent the front and rear walls of the shutter respectively, with the latter having an arm or pointer extending from the ring along the shutter periphery to the shutter front wall. In addition, the shutter cocking and release levers and the photoflash adjusting arms, of known shutter construction, usually project laterally from the shutter housing. It is therefore necessary with these known constructions for the operator first to adjust the various shutter settings before the camera can be placed in its normal position for making exposures.

With the present invention, the shutter speed, diaphragm, and photoflash mechanisms are set by means of coaxial rings which are rotatable relative to scales and index marks visible to the operator as he holds the camera in position for operation. Further, the shutter cocking and release levers extend rearwardly from the shutter rear wall into the body of the camera to which the shutter is attached, to be conveniently actuated by the shutter tensioning and shutter release members of known form which are built into the camera body as an integral part thereof. Also, the elimination of outwardly projecting levers or finger pieces results in a shutter of much smoother and more attractive contour so that the shutter resembles, in appearance, an interchangeable lens construction.

The internal mechanism of the shutter, which corresponds in general to the construction in the copending U.S. patent application of Franz Singer, Serial No. 306,562, filed August 27, 1952 (now Patent 2,785,612, granted March 19, 1951), is only fragmentarily described hereinafter merely as an illustrative example and to an extent necessary for a clear understanding of the present invention, it being understood that a more detailed explanation of the internal mechanism of the shutter is presented in said copending application.

In the present embodiment of the invention, the shutter includes a hollow shutter housing or casing 10 having at 12, a rear lens tube, when the shutter is viewed with the camera in its normal operating position, or a bottom lens tube, when the shutter is placed in a horizontal position. Fixed wtihin the shutter housing 10 in spaced relationship with the rear wall thereof, is a base plate or partition 14 from which extends forwardly the usual front lens tube (not shown). Within the housing 10, between the shutter front wall and the base plate 14, is disposed, as in the conventional shutter constructions, the various shutter mechanisms, while an annular space between the housing rear wall and the base plate 14 contains the usual shutter blades and the diaphragm (not shown). Except for the differences as hereafter noted, the iris diaphragm leaves, the shutter blades, and the various operating parts and control parts may be constructed substantially as disclosed in U.S. Patent 1,687,123, granted October 9, 1928, for an invention of F. Deckel and M. Geiger.

Adjacent the front portion of the housing 10 is a shutter speed setting member or plate 22 which corresponds in function to the speed setting ring 63 of said Deckel patent and which is likewise rotatably mounted on the front lens tube and is held in its axial position by the cover plate 24. The cover plate 24 is rigidly fixed to the front lens tube, and is provided with a suitable central opening to permit the passage of light rays to within the camera. At the rear of the shutter housing 10 is a diaphragm setting member 26 which is rotatably mounted on the rear lens tube 12 and operatively connected with the iris diaphragm or stop adjusting ring.

As best seen in Fig. 1, the cocking and release shafts 28 and 30, respectively, of the shutter blade drive mechanism extend outwardly through the rear wall of the shutter housing 10. Connection with the photoflash synchronizing mechanism contained within the housing (not shown) is facilitated by the contact terminal 32, electrically insulated from the housing or casing, which extends outwardly from the housing rear wall, while the housing itself constitutes the other terminal of the flashlight circuit.

The shutter speed setting member 22 is connected by screws 34, or the like, to a setting ring 136, having a portion disposed outwardly of the periphery of the shutter housing 10 and cover plate 24, and is provided with gripping serrations or notches 138. The diaphragm setting member 26 has connected thereto, as by screws 240, an internal flange formed at the rear end of a tubular setting ring 140 disposed outwardly of and coaxially with the shutter housing 10. The periphery of the setting ring 140 is also provided with gripping serrations or notches 142. Positioned between the adjacent edge portions of the setting rings 136 and 140, and fixed to the shutter housing 10, is a narrow ring 200 having an index or reference mark 202 which cooperates with the shutter speed scale 150 on the periphery of the setting ring 136 and the diaphragm setting scale 168 on the periphery of the setting ring 140.

The shutter speed setting member 22 and the diaphragm setting member 26 are releasably connected by a resilient coupling arm or tongue of any suitable form which is secured to one of the setting members and engages the gripping serrations or notches of the other member. This resilient coupling tongue has not been shown in order that clarity be maintained.

Figure 2:
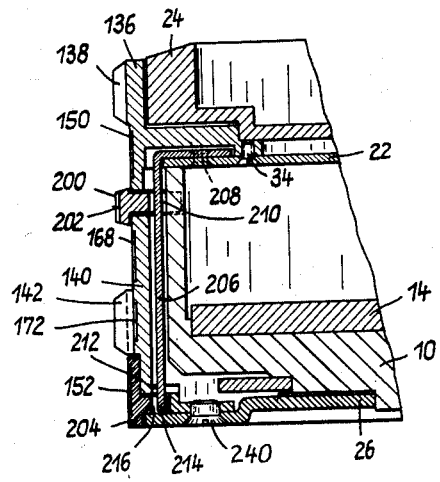
Fig. 2 is a partial radial section through the shutter shown in Fig. 1 with various shutter parts removed.

The relative position at which the setting members 22 and 26 are coupled to each other by the resilient tongue, is shown by the total exposure value scale 152 formed on the periphery of a ring 204, rotatably mounted on a rear portion of the setting ring 140 and held in axial position by a portion of the diaphragm setting member 26 as shown in Fig. 2. The setting member 22 and ring 204 are connected for unitary movement by a driving arm or tongue 206 which has one end fastened, as by a screw or rivet 208, to the member 22. The tongue 206 is disposed approximately parallel to the optical axis of the shutter in the space formed between the shutter housing 10 and the setting ring 140 and passes through suitable arcuate slots 210 and 212 in the rings 200 and 140, respectively, which permit movement of the ring 140, 200, and 204 relative to each other. The rear end 214 of the tongue 206 engages within the recess 216 of the ring 204, and therefore rotary movement of the shutter speed setting member 22 by the setting ring 136 causes a like movement of the ring 204 without affecting the diaphragm setting member 26 or the setting ring 140.

To indicate the total exposure value for which the shutter is set, an index mark 172, is provided on a recessed part of the periphery of the setting ring 140 adjacent its rear edge, and cooperates with the total exposure value scale 152 and on the ring 204.

In operation the total exposure value is first determined, either on the basis of an exposure meter reading or by estimation. The operator then sets the shutter for the desired total exposure value by rotating the setting ring 136 relative to the setting ring 140 until the proper total exposure value on the scale 152 is disposed opposite the index mark 172. Since the setting rings 136 and 140 are detachably or adjustably coupled by means of a resilient tongue the relative rotative movements of the rings 136 and 140 will cause one end of the tongue to ride along the serrated or grooved periphery of one of the setting rings. Once these rings are properly oriented, the free end of the tongue engages with the serrations or grooves of one of the setting members to hold the setting rings 136 and 140 in coupled relationship. If for example the total exposure value is 10, this value on the scale 152 would be opposite the index mark 172 as shown in Fig. 1.

Once the shutter is set according to the proper total exposure value, the operator may select either the desired shutter speed or the desired diaphragm aperture by reading the shutter speed value on scale 150 and the diaphragm aperture reading on scale 168 which are alined with the index mark 202. Thus, in Fig. 1, the shutter is set for a speed of 1/15 of a second and a diaphragm aperture or f number of 8. If it is desired to employ a shutter speed or diaphragm aperture other than those shown in Fig. 1, the operator needs merely to rotate one of the setting rings 136 or 140, which remain coupled to each other by the above-mentioned resilient coupling tongue in order to aline a different set of readings with the index mark 202. Thus, rotating the coupled setting rings 136 and 140 in Fig. 1 one graduation to the right would set the shutter for a speed of 1/8 of a second for example, and simultaneously reduce the stop or diaphragm opening to f/11, while rotation of the coupled rings one graduation to the left from the illustrated position would provide a shutter speed, for instance, of 1/30 of a second and a diaphragm aperture of f/5.6, while still maintaining the indicated total exposure value of 10.

It is noted that in the illustrated embodiment, the rings 138, 142, and 200 are of substantially equal diameter, are axially spaced from each other, and are separated from each other by relatively smooth cylindrical sections of smaller diameter than the rings. Thus the shutter assumes a very neat and generally tubular modern appearance of familiar interchangeable lens attachment, and is free of unsightly radially protruding levers or finger pieces, since the shutter tensioning members 28 and shutter release or trigger members 30 extend out the back of the shutter and into the body of the camera with which it is used. In addition, the various shutter scales are visible to the operator looking vertically downwardly onto the top of the shutter as the camera is held in the usual operative position, thus facilitating rapid and accurate shutter setting with a minimum of adjustment.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter and diaphragm unit comprising a stationary casing including a substantially cylindrical side wall having an axis substantially coinciding with the optical axis of the shutter, an external speed adjusting ring rotatably mounted on said casing near the front thereof and including a first circumferentially extending serrated rib and a first substantially smooth cylindrical flange of smaller external diameter than said rib and extending axially rearwardly from said rib, an external aperture adjusting ring rotatably mounted on said casing rearwardly of said speed adjusting ring and including a second circumferentially extending serrated rib and a second substantially smooth cylindrical flange of smaller external diameter than said second rib and extending axially forwardly from said second rib toward said first rib, the forward edge of said second circumferential flange being spaced axially rearwardly from the rear edge of said first circumferential flange, a stationary third ring including a third rib fixed to said casing to remain stationary therewith and projecting radially outwardly from the casing in the space between said rear edge of the first circumferential flange and the forward edge of the second circumferential flange, a fourth ring extending circumferentially around and rotatable with respect to said stationary casing and having a substantially smooth cylindrical flange lying rearwardly of and relatively close to said second rib on said aperture adjusting ring, a driving connection between said speed adjusting ring and said fourth ring to couple said rings to each other for conjoint turning movement relative to said stationary casing, said driving connection including an axially directed portion located between said casing and alined portions of said aperture adjusting ring, said stationary third ring and said first cylindrical flange of said speed adjusting ring, a shutter speed scale graduated circumferentially on said first cylindrical flange of said speed adjusting ring, a diaphragm aperture scale graduated circumferentially on said second cylindrical flange of said aperture adjusting ring, an index mark on said stationary third ring for reading set values of both said shutter speed scale and said diaphragm aperture scale, an exposure value scale graduated circumferentially on said cylindrical flange of said fourth ring, and a second index mark on said second rib of said aperture adjusting ring for reading a value of said exposure value scale.

2. A photographic shutter unit of the type having shutter blade operating mechanism, a stationary casing of generally annular form with a substantially cylindrical outer wall for enclosing said mechanism, a shutter speed control ring rotatably mounted on said casing approximately at the front thereof, and a diaphragm aperture control ring rotatably mounted on said casing approximately at the rear thereof, characterized by the provision of a stationary rib extending circumferentially around said outer wall of said casing intermediate the front and rear ends of said outer wall and projecting radially outwardly from said outer wall, said rib having front and rear faces both of which are provided with undercut annular grooves, an external shutter speed adjusting ring rotatably mounted on said casing forwardly of said rib and having a cylindrical flange surrounding said outer wall of said casing, the rear edge of said cylindrical flange being located in the undercut groove at the front face of said rib, a connection fastening said cylindrical flange to said speed control ring to turn therewith, an external diaphragm aperture adjusting ring rotatably mounted on said casing rearwardly of said rib and having a cylindrical flange surrounding said outer wall of said casing, the front edge of said last mentioned cylindrical flange being located in the undercut groove at the rear face of said rib, a connection fastening said last mentioned cylindrical flange to said aperture control ring to turn therewith, a reference mark on said stationary rib, a graduated diaphragm aperture scale marked circumferentially on said last mentioned cylindrical flange to indicate the position of said aperture adjusting ring and aperture control ring with respect to said reference mark, a graduated shutter speed scale marked circumferentially on said first mentioned cylindrical flange to indicate the position of said speed adjusting ring and speed control ring with respect to said reference mark, a light value scale ring partially overlying the rear portion of said aperture adjusting ring and bearing a circumferentially arranged light value scale, a reference mark on said aperture adjusting ring for cooperation with said light value scale, and means providing a hidden coupling between said speed adjusting ring and said light value scale ring for turning said light value scale ring in response to turning movements of said speed adjusting ring.

3. A photographic shutter unit of the type having shutter blade operating mechanism, a stationary casing of generally annular form with a substantially cylindrical outer wall for enclosing said mechanism, a shutter speed control ring rotatably mounted on said casing approximately at the front thereof, and a diaphragm aperture control ring rotatably mounted on said casing approximately at the rear thereof, characterized by the provision of a stationary rib extending circumferentially around said outer wall of said casing intermediate the front and rear ends of said outer wall and projecting radially outwardly from said outer wall, said rib having front and rear faces both of which are provided with undercut annular grooves, an external shutter speed adjusting ring rotatably mounted on said casing forwardly of said rib and having a cylindrical flange surrounding said outer wall of said casing, the rear edge of said cylindrical flange being located in the undercut groove at the front face of said rib, a connection fastening said cylindrical flange to said speed control ring to turn therewith, an external diaphragm aperture adjusting ring rotatably mounted on said casing rearwardly of said rib and having a cylindrical flange surrounding said outer wall of said casing, the front edge of said last mentioned cylindrical flange being located in the undercut groove at the rear face of said rib, a connection fastening said last mentioned cylindrical flange to said aperture control ring to turn therewith, a reference mark on said stationary rib, a graduated diaphragm aperture scale marked circumferentially on said last mentioned cylindrical flange to indicate the position of said aperture adjusting ring and aperture control ring with respect to said reference mark, a graduated shutter speed scale marked circumferentially on said first mentioned cylindrical flange to indicate the position of said speed adjusting ring and speed control ring with respect to said reference mark, a substantially cylindrical light value scale ring surrounding and having rotatable bearing on the rear portion of said aperture adjusting ring, a light value scale marked circumferentially on said last mentioned ring, a reference mark on said aperture adjusting ring for indicating by reference to said last mentioned scale, the relative position of orientation of said light value scale ring with respect to said aperture adjusting ring, and a connecting member extending substantially parallel to the axis of said cylindrical wall of said casing and operatively connected at its forward end to said speed control ring and at its rear end to said light value scale ring to turn said scale ring from turning movements of said speed control ring, said connecting member being covered and hidden by said diaphragm aperture adjusting ring.

References Cited in the file of this patent

UNITED STATES PATENTS

| | | |
|---|---|---|
| 1,543,208 | Fairchild | June 23, 1925 |
| 1,623,998 | Cooke | Apr. 12, 1927 |
| 1,626,032 | Fairchild | Apr. 26, 1927 |
| 1,678,119 | Klein | July 24, 1928 |
| 2,439,087 | Harvey | Apr. 6, 1948 |
| 2,443,158 | Eagle et al. | June 8, 1948 |
| 2,553,394 | Willcox | May 15, 1951 |
| 2,596,328 | Dorsey | May 13, 1952 |
| 2,655,085 | Gebele | Oct. 13, 1953 |
| 2,697,391 | Gebele | Dec. 21, 1954 |
| 2,730,026 | Welanetz | Jan. 10, 1956 |

FOREIGN PATENTS

| | | |
|---|---|---|
| 7,787 | Great Britain | of 1914 |
| 303,088 | Germany | Jan. 18, 1918 |
| 206,965 | Switzerland | Dec. 1, 1939 |
| 1,090,214 | France | Oct. 13, 1954 |
| 1,091,432 | France | Oct. 27, 1954 |